United States Patent
Cote

(10) Patent No.: US 9,956,810 B2
(45) Date of Patent: May 1, 2018

(54) SCENTED WRITING INSTRUMENTS AND METHODS FOR MAKING THE SAME

(71) Applicant: Christopher W. E. Cote, Santee, CA (US)

(72) Inventor: Christopher W. E. Cote, Santee, CA (US)

(*) Notice: Subject to any disclaimer, the term of this patent is extended or adjusted under 35 U.S.C. 154(b) by 0 days. days.

(21) Appl. No.: 15/185,813

(22) Filed: Jun. 17, 2016

(65) Prior Publication Data

US 2016/0368307 A1    Dec. 22, 2016

Related U.S. Application Data

(60) Provisional application No. 62/182,271, filed on Jun. 19, 2015.

(51) Int. Cl.
| | |
|---|---|
| *B43K 21/10* | (2006.01) |
| *B43K 29/00* | (2006.01) |
| *B43K 24/06* | (2006.01) |
| *B43K 19/00* | (2006.01) |
| *B43K 23/016* | (2006.01) |
| *C09D 13/00* | (2006.01) |

(52) U.S. Cl.
CPC ............. *B43K 29/00* (2013.01); *B43K 19/00* (2013.01); *B43K 23/016* (2013.01); *B43K 24/06* (2013.01); *C09D 13/00* (2013.01)

(58) Field of Classification Search
CPC ..................................................... B43K 24/06
USPC ................................................ 401/64, 116
See application file for complete search history.

(56) References Cited

U.S. PATENT DOCUMENTS

| | | | | | |
|---|---|---|---|---|---|
| 3,888,416 | A | * | 6/1975 | Lin ................. | B43K 29/00 239/34 |
| 4,728,212 | A | * | 3/1988 | Spector ............ | A61L 9/12 40/334 |
| 5,547,300 | A | * | 8/1996 | Powers ............. | A45D 40/04 401/68 |
| 7,524,123 | B1 | * | 4/2009 | Cote ................ | B43K 7/005 401/195 |
| 2015/0197118 | A1 | * | 7/2015 | Wagenheim ....... | B43K 29/20 401/195 |

FOREIGN PATENT DOCUMENTS

JP        2009108273 A  *  5/2009

* cited by examiner

*Primary Examiner* — Jennifer C Chiang
(74) *Attorney, Agent, or Firm* — Mark Wisnosky

(57) ABSTRACT

A scented writing instrument may include a moveable barrel and a writing implement coupled to the moveable barrel. The writing implement may be adapted to emit a selective scent. The writing instrument may also include an outer casing and a top casing coupled to the moveable barrel. The outer casing may have an interior cavity configured to coupleably receive the writing implement and the moveable barrel. The top casing may be configured to extend the writing implement in an axial direction between a retracted position and an extended position. Related methods of manufacturing the scented writing instrument are also provided.

10 Claims, 1 Drawing Sheet

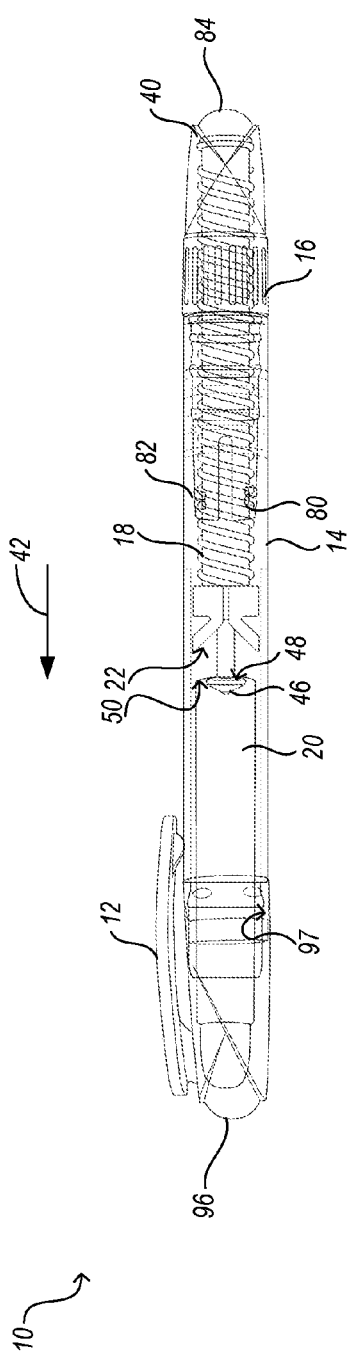
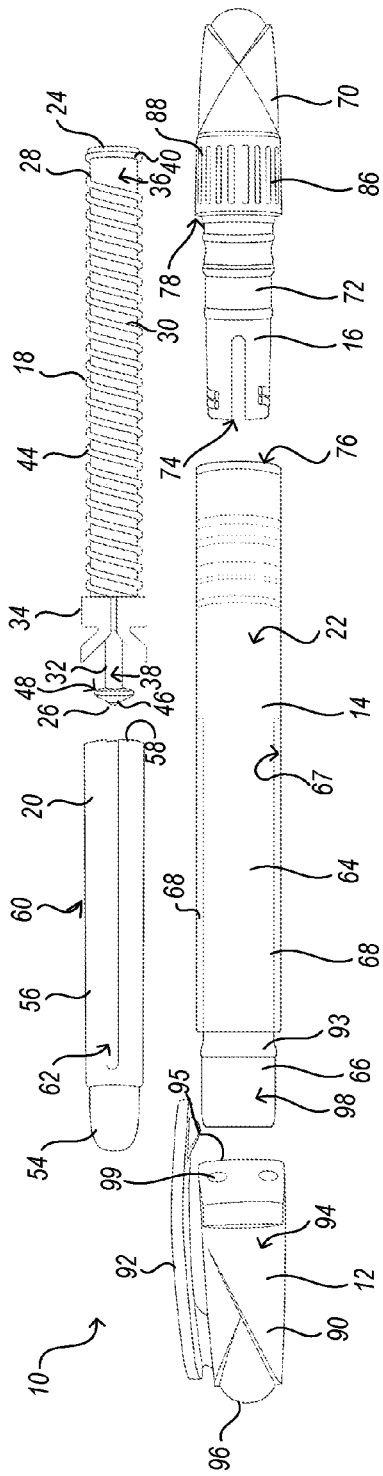
FIG. 1
FIG. 2

SCENTED WRITING INSTRUMENTS AND METHODS FOR MAKING THE SAME

BACKGROUND

Technical Field

The present disclosure relates to writing instruments and, more particularly, to scented writing instruments.

Description of the Related Art

Writing instruments are generally conventionally constructed of a plastic casing surrounding a consumable substrate, such as, for example, a wax crayon, lead, or the like. Few unique modifications or features to make the writing instruments more appealing and marketable have been introduced over the years; and consequently the lack of distinguishing features amongst the different writing instruments currently available make consumers' choice difficult.

BRIEF SUMMARY

The methods and devices described herein provide for writing instruments that are particularly appealing and marketable, with robust and efficient form factors. According to one embodiment, a method of manufacturing a writing instrument may be summarized as including providing a fragrance composition, a wax composition, and a coloring agent; and mixing the fragrance composition, the wax composition, and the coloring agent to form a molding composition. The method may further include injecting the molding composition into a mold and cooling the molding compound until a solid writing implement is formed, wherein the solid writing implement emits a selective scent.

According to another embodiment, a scented writing instrument may be summarized as including a moveable barrel; a writing implement coupled to the moveable barrel, wherein the writing implement is adapted to emit a selective scent; an outer casing having an interior cavity configured to coupleably receive the writing implement and the moveable barrel; and a top casing coupled to the moveable barrel. The top casing may be configured to extend the writing implement in an axial direction between a retracted position and an extended position.

BRIEF DESCRIPTION OF THE SEVERAL VIEWS OF THE DRAWINGS

FIG. 1 is a plan view schematically illustrating a scented writing instrument, according to one embodiment.

FIG. 2 is an exploded view of the scented writing instrument of FIG. 1.

DETAILED DESCRIPTION

In the following description, certain specific details are set forth in order to provide a thorough understanding of various disclosed embodiments. One skilled in the relevant art will recognize that embodiments may be practiced without one or more of these specific details. In other instances, well-known structures and devices associated with writing instruments and methods to manufacture the same may not be shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

FIGS. 1 and 2 illustrate a scented writing instrument 10, according to one embodiment. The scented writing instrument 10 includes a cap 12, an outer casing 14, a top casing 16, a moveable barrel 18, and a writing implement 20. The outer casing 14 includes an interior cavity 22 that is configured to receive the top casing 16, moveable barrel 18, and writing implement 20.

The moveable barrel 18 includes a first end 24 and a second end 26, and a shaft 28 extending therebetween. The shaft 28 has a generally cylindrical shape and includes a first portion 30 and a second portion 32 with a block element 34 interposed therebetween. The first portion 30 has an outer surface 36 that circumferentially surrounds the first portion 30. The second portion 32 also has, in part, an outer surface 38 that circumferentially surrounds the second portion 32. The outer surface 36 of the first portion 30 is sized and shaped to be generally larger than the outer surface 38 of the second portion 32.

Proximal to the first end 24, the first portion 30 of the shaft 28 includes a stop member 40. The stop member 40 is generally cylindrical shaped and circumferentially surrounds the outer surface 36 of the first portion 30. More particularly, the stop member 40 is configured to inhibit, retard, or stop axial movement of the moveable barrel 18 as the moveable barrel 18 extends a selected distance in an axial direction indicated by arrow 42, as is discussed in more detail below.

The first portion 30 includes an external thread member 44 which extends from proximate the first end 24 to the block element 34. More particularly, the external thread member 44 surrounds the outer surface 36 of the first portion 30 and extends in a spiral manner in the axial direction from proximate the first end 24 toward the block element 34.

The second portion 32 of the shaft 28 extends in the axial direction from the block element 34 to the second end 26 and includes an end member 46 proximate the second end 26. The end member 46 has a generally conical shape. As illustrated in FIG. 1, the moveable barrel 18 is coupled to the writing implement 20. More particularly, when the moveable barrel 18 is coupled to the writing implement 20, an interior surface 48 of the end member 46 substantially abuts or makes contact with a receiving surface 50 of the writing implement 20, such that the moveable barrel 18 is fixedly coupled to the writing implement 20. Thus, movement of the moveable barrel 18 in the axial direction 42 axially moves the writing implement 20.

The writing implement 20 includes a tip portion 54 and an interior portion 56. The tip portion 54 is generally exposed to an exterior when in use, so that a user may write, draw, color, paint, or perform similar functions, with the scented writing instrument 10.

The interior portion 56 extends in the axial direction 42 from an upper end 58 thereof toward the tip portion 54. The interior portion 56 has a generally cylindrical cross-sectional shape and includes an outer surface 60 that circumferentially surrounds the interior portion 56. As discussed above, the writing implement 20 is coupled to the moveable barrel 18. In particular, when the writing implement 20 is coupled to the moveable barrel 18, the receiving surface 50 of the interior portion 56 of the writing implement 20, which abuts or makes substantial contact with the interior surface 48 of the end member 46 of the second portion 32 of the shaft 28, is located proximate to the upper end 58.

The interior portion 56 includes a pair of recesses 62 that partially extend through the outer surface 60 of the interior portion 56. The recesses 62 extend longitudinally in the axial direction 42 and are configured to couple the writing implement 20 to the outer casing 14.

As discussed above, the outer casing 14 includes the interior cavity 22 which is configured to receive the writing implement 20 and the moveable barrel 18. The outer casing 14 includes an exterior portion 64 and a lower portion 66. The interior cavity 22 extends through the exterior, lower portions 64, 66 through which the writing implement 20 and the moveable barrel 18 are received. In particular, an interior surface 67 of the exterior portion 64 includes a pair of protrusions 68 that extend longitudinally in the axial direction 42. The protrusions 68 are configured to be coupleably received by the recesses 62 of the writing implement 20, such that the writing implement 20 can have a fully retractable position (FIG. 1), a fully extendable position, and any position therebetween. More particularly, the protrusions 68 and the recesses 62 allow movement of the writing implement 20 in the axial direction 42, in addition to providing stability when the user is writing, drawing, coloring, painting, or the like, with the scented writing instrument 10. In addition, the longitudinal lengths of the protrusions 68 and the recesses 62 are selected such that, in the fully retracted position, at least a portion of the tip portion 54 is exposed to permit the user to write, draw, color, paint, or the like with the scented writing instrument 10.

As illustrated in FIG. 1, the interior cavity 22 of the outer casing 14 also coupleably receives the top casing 16. The top casing 16 includes an upper portion 70 and a stem portion 72 with a receiving cavity 74 extending through the upper portion 70 and the stem portion 72. The stem portion 72 is configured to extend over at least an exposed portion of the first portion 30 of the shaft 28 when the moveable barrel 18 is received in the interior cavity 22 of the outer casing 14 and the writing implement 20 is in a fully retracted position. As such, the stem portion 72 is sandwiched between the outer casing 14 and the moveable barrel 18, wherein the first portion 30 of the moveable barrel 18 is received within the receiving cavity 74, such that an end surface 76 of the outer casing 14 substantially abuts or makes contact with a mating surface 78 of the upper portion 70 when the top casing 16 is coupled to the outer casing 14.

As discussed above, the moveable barrel 18 is configured to move the writing implement 20 in the axial direction 42 between the fully retracted and extended positions. More particularly, an interior side 80 of the stem portion 72 includes internal thread members 82. The internal thread members 82 are configured to cooperate with the external thread member 44 of the first portion 30 of the moveable barrel 18. The internal thread members 82 are engagingly coupled to the external thread member 44 of the moveable barrel 18 such that rotary motion of the top casing 16 may be converted to linear motion of the moveable barrel 18 and the writing implement 20.

By way of example, in the embodiment of the scented writing instrument 10 illustrated in FIGS. 1 and 2, a clockwise rotation of the top casing 16 causes linear movement of the moveable barrel 18 and the writing implement 20 in the axial direction 42 between the fully retracted and extended positions. As illustrated in FIG. 1, when the writing implement 20 and the moveable barrel 18 are in the fully retracted position, the stop member 40 of the moveable barrel 18 is positioned proximate to an upper end 84 of the top casing 16. As the writing implement 20 and the moveable barrel 18 are extended to the fully extended position, the stop member 40 substantially abuts or makes contact with at least a portion of the internal thread member 82, thereby preventing, restricting, or hindering further movement of the moveable barrel 18 and the writing implement 20.

In some embodiments, including the embodiment illustrated in FIGS. 1 and 2, the top casing 16 may optionally include a gripping feature 86. By way of example, the upper portion 70 of the top casing 16 includes a plurality of slits 88 partially extending through the upper portion 70. The plurality of slits 88 are spaced apart circumferentially to facilitate gripping by the user when rotating the top casing 16 to move the moveable barrel 18 and the writing implement 20 in the axial direction 42 between the fully retracted and extended positions.

As discussed in more detail above, a portion of the writing implement 20 is exposed to the exterior when the writing implement 20 is in the fully retracted position. The cap 12 is configured to enclose or cover the exposed portion of the writing implement 20. The cap 12 includes a main body 90 and a pocket clip 92 coupled to the main body 90. The pocket clip 92 is configured to secure the scented writing instrument 10 to objects such as shirt pockets, pant pockets, or any other object that may be used to secure the scented writing instrument 10 thereto.

The cap 12 is configured to be removably coupled to the outer casing 14. More particularly, the main body 90 includes a cap cavity 94 which is sized and shaped to enclose or cover the exposed portion of the writing implement 20 when the scented writing instrument 10 is in a closed configuration. The main body 90 and the cap cavity 94 tapers or necks down from a first open end 95 to a terminal end 96 of the main body 90, such that, when the scented writing instrument 10 is in the closed configuration, i.e., the cap 12 is coupled to the outer casing 14, an interior surface 97 of the main body 90 makes frictional contact with an outer casing mating surface 98 of the lower portion 66 of the outer casing 14. In this manner, the cap 12 can remain closed until sufficient force is applied to overcome the frictional force resulting from the frictional contact of the interior surface 97 of the main body 90 and the outer casing mating surface 98 of the lower portion 66 of the outer casing 14.

The main body 90 of the cap 12 also includes a plurality of posts 99 protruding from the interior surface 97 of the main body 90. The posts 99 are circumferentially spaced apart on the internal surface 97 of the main body 90. When the user is coupling the cap 12 to the outer casing 14, the posts 99 slide over a lip 93 of the outer casing 14. The lip 93 has a generally cylindrical cross-sectional shape and circumferentially surrounds and protrudes outwardly from the outer casing mating surface 98 of the lower portion 66 of the outer casing 14. In this manner, when the scented writing instrument 10 is in the closed configuration, the lip 93 resists, stops, or prevents the cap 12 from falling off from the outer casing 14.

The writing implement 20 of the scented writing instrument 10 is selected to emit a scent or a fragrance. For example, when the writing instrument 10 is held in the user's hands, the writing implement 20 emits a scent or fragrance. By way of further example, when the writing implement 20 is used to write, paint, draw, color, or the like, a portion of the writing implement 20 is transferred, adhered, or applied to a paper, cardboard, etc., the transferred, adhered, or applied writing implement 20 emits a scent or fragrance.

The writing implement 20 is formed from a substrate that may comprise a wax composition, a fragrance composition, and a coloring agent. In some embodiments, the wax composition may comprise a wax blend, sodium laurate, sodium hyaluronate, sodium palmitate, stearic acid, and glycerine. In some embodiments, the wax blend may comprise mixed glycerides which may be derived from natural sources or may be synthetically produced. By way of example, in one embodiment, the wax blend may comprise a vegetable-based wax, such as sumac wax, tallow tree wax, soy wax, or the like. The sumac wax, for example, may comprise palmitin, stearin, oleic acid, and japanic acid. In some embodiments, the sumax wax may contain about 10-15% palmitin. In some embodiments, the sumax wax may contain about 1% japanic acid.

As noted above, the substrate of the writing implement may also comprise a fragrance composition. In some embodiments, the fragrance composition may be a liquid-based fragrance. In other embodiments, the fragrance composition may be powder-based. The fragrance composition may take a wide variety of forms, such as aqueous, alcoholic, oil-based solutions, or any petroleum-based compound. In particular, the fragrance composition is configured to have a selective aroma, such as strawberry, coffee, orange cream, etc.

As noted above, the substrate of the writing implement 20 may also comprise a coloring agent. The coloring agent is selected so that the writing implement 20 may impart a certain color, such as green, orange, red, blue, etc., when the writing implement is transferred, adhered, or applied. The coloring agent may be formed from conventional pigments, marking inks, or the like.

A method to manufacture the various embodiments of the scented writing instruments (e.g., writing instrument 10) is also provided. According to one embodiment, the method includes providing compositions of a mold composition to form the substrate of the writing implement. The mold composition may be formed by blending or mixing a wax composition, a fragrance composition, and a coloring agent. Again, the wax composition may comprise a wax blend, sodium laurate, sodium hyaluronate, sodium palmitate, stearic acid, and glycerine. As discussed above, the wax blend may be derived from natural sources or may be synthetically produced. The fragrance composition may be liquid-based or powder-based. The molding composition may be poured into a holder device. In some embodiments, prior to pouring the molding composition, the molding composition may be heated to suitable temperatures, such as, for example, between 200° F. to 400° F., in a heat chamber, for example. In other embodiments, the molding composition may be heated together to suitable temperatures, after pouring the molding composition into the holder device.

The molding composition, once poured into the holder device, may be mixed, blended and/or stirred for a certain duration. For example, in some embodiments, the molding composition may be mixed for a duration of 30 minutes, one hour, two hours, or any other suitable duration.

The fragrance composition of the molding composition may be provided in optimal percentages by weight or volume. For example, in some embodiments, the fragrance composition may comprise between about 5% to 20% by weight or volume of the total solution or the molding composition. In other embodiments, the fragrance composition may comprise about 15% by weight or volume of the total solution or the molding composition. In particular, applicant has discovered, via experimentation and substantial field testing, that providing fragrance composition in such percentages optimizes the released aroma or scent of the fragrance. For example, by providing the fragrance composition in about 15% by weight or volume, the aroma or scent released may have optimal strength and may be released for a duration of up to about six months. In some embodiments, the percentage of fragrance composition may be selectively adjusted to selectively increase or decrease the duration the aroma or scent may be released from the various embodiments of the scented writing instruments.

The molding composition formed after mixing and heating the wax composition, fragrance composition, and the coloring agent may thereafter be injected or cast into a mold. In some embodiments, the molding composition may be cooled prior to injection. In other embodiments, the molding composition may remain at higher temperatures due to the heating of the molding composition, as described above, during injection. The mold may be configured such that a final exterior form of an article formed by the molding process may represent the writing implement of the scented writing instrument described herein. The molding composition may be injected into cavities of the mold via injectors or injection devices having suitable pressure and injection rates. Further, in some embodiments, the mold may also be subjected to heating to various temperatures, for example, temperatures ranging between 200° F. to 400° F., or any other suitable temperature.

Thereafter, a solidification or curing process may be initiated to solidify the molding composition into solid form. For example, in some embodiments, the mold may be cooled at ambient temperature for a duration of between 30 minutes to about 24 hours. In other embodiments, the mold may be cooled for between about 24 hours to about 48 hours at ambient temperature. In some embodiments, the solidification or curing process may include injecting a cooling liquid over the mold. The cooling liquid may be set to suitable temperatures to expedite the solidification step. Still further, in some embodiments, certain catalysts may be added to expedite the curing process. After the molding composition has solidified, the writing implement in its final exterior form may be removed from the mold.

The other components of the scented writing instruments including the top casing, outer casing, cap, and moveable barrel may be formed via various molding processes, such as injection molding, compression molding, or the like. Injection molding can include, but is not limited to, plastic injection molding, reaction injection molding, injection-compression molding, or other processes for shaping moldable materials.

The moveable barrel may be coupled to the writing implement after removal of the writing implement from the mold. The moveable barrel and the writing implement may thereafter be coupleably received by the outer casing. The top casing may thereafter be coupled to the outer casing and the moveable barrel. The cap may then be removably coupled to the outer casing to complete the assembly of the scented writing instrument. In some embodiments, selective labels may then be adhesively affixed to the outer casing of the scented writing instrument.

Moreover, the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A scented writing instrument comprising: a moveable barrel; a writing implement coupled to the moveable barrel, the writing implement adapted to emit a selective scent; an outer casing having an interior cavity configured to coupleably receive the writing implement and the moveable barrel; and a top casing coupled to the moveable barrel, the top casing configured to extend the writing implement in an axial direction between a retracted position and an extended position, wherein the moveable barrel includes an external thread member and the top casing includes an internal thread member, the external and internal thread members cooperating to move the writing implement in the axial direction between the retracted and extended positions.

2. The scented writing instrument of claim 1 wherein the writing implement includes a composition comprising a fragrance composition, a wax composition, and a coloring agent.

3. The scented instrument of claim 1 wherein the top casing is rotatably coupled to the moveable barrel, rotary movement of the top casing extending the writing implement in the axial direction between the retracted and extended positions.

4. The scented writing instrument of claim 1, further comprising: a cap removeably coupled to the outer casing.

5. A scented writing instrument comprising: a moveable barrel; a writing implement coupled to the moveable barrel, the writing implement adapted to emit a selective scent; an outer casing having an interior cavity configured to coupleably receive the writing implement and the moveable barrel; and a top casing coupled to the moveable barrel, the top casing configured to extend the writing implement in an axial direction between a retracted position and an extended position, wherein the writing implement includes a recess and the outer casing includes a protrusion, the recess configured to receive the protrusion to slideably couple the writing implement to the outer casing.

6. The scented writing instrument of claim 5 wherein the writing implement includes a composition comprising a fragrance composition, a wax composition, and a coloring agent.

7. The scented writing instrument of claim 5, further comprising: a cap removeably coupled to the outer casing.

8. A scented writing instrument comprising: a moveable barrel; a writing implement coupled to the moveable barrel, the writing implement adapted to emit a selective scent; an outer casing having an interior cavity configured to coupleably receive the writing implement and the moveable barrel; and a top casing coupled to the moveable barrel, the top casing configured to extend the writing implement in an axial direction between a retracted position and an extended position, wherein the moveable barrel includes an end member having a substantially conical shape, the end member configured to couple the moveable barrel to the writing implement such that axial movement of the moveable barrel extends the writing implement between the retracted and extended positions.

9. The scented writing instrument of claim 8 wherein the writing implement includes a composition comprising a fragrance composition, a wax composition, and a coloring agent.

10. The scented writing instrument of claim 8, further comprising: a cap removeably coupled to the outer casing.

* * * * *